United States Patent
Gu et al.

(10) Patent No.: US 12,307,338 B2
(45) Date of Patent: May 20, 2025

(54) COUNTERFACTUAL POLICY EVALUATION OF MODEL PERFORMANCE

(71) Applicant: Maplebear Inc., San Francisco, CA (US)

(72) Inventors: Jonathan Gu, San Francisco, CA (US); Bo Xiao, Hillsborough, CA (US); Yixi Ouyang, Milpitas, CA (US); Jennifer Wiersema, Oakland, CA (US); Ying Li, San Francisco, CA (US); Matias Cersosimo, Stanford, CA (US); Rustin Partow, San Francisco, CA (US); Levi Boxell, Brownsburg, IN (US); Tilman Drerup, Palo Alto, CA (US); Oleksii Stepanian, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/393,349

(22) Filed: Dec. 21, 2023

(65) Prior Publication Data
US 2024/0220859 A1 Jul. 4, 2024

Related U.S. Application Data

(60) Provisional application No. 63/478,138, filed on Dec. 31, 2022.

(51) Int. Cl.
*G06N 20/00* (2019.01)
*G06N 3/084* (2023.01)
*G06Q 30/01* (2023.01)

(52) U.S. Cl.
CPC ............ *G06N 20/00* (2019.01); *G06N 3/084* (2013.01); *G06Q 30/01* (2013.01)

(58) Field of Classification Search
CPC ...... G06N 20/00; G06N 3/084; G06N 3/0895; G06Q 30/01
See application file for complete search history.

(56) References Cited

U.S. PATENT DOCUMENTS

| | | |
|---|---|---|
| 2015/0379411 A1 | 12/2015 | Kapoor et al. |
| 2017/0244655 A1 | 8/2017 | Moon et al. |

(Continued)

FOREIGN PATENT DOCUMENTS

| | | |
|---|---|---|
| WO | WO 2020/132518 A1 | 6/2020 |
| WO | WO 2021/007051 A1 | 1/2021 |

OTHER PUBLICATIONS

PCT International Search Report and Written Opinion, PCT Application No. PCT/US2023/085802, Apr. 9, 2024, 16 pages.

(Continued)

*Primary Examiner* — Dave Misir
(74) *Attorney, Agent, or Firm* — Fenwick & West LLP

(57) ABSTRACT

An online system uses an offline iterative clustering process to evaluate the performance of a set of content selection frameworks. To perform an iteration of the iterative clustering process, an online system clusters the testing example data into a set of clusters. An online system computes a set of framework scores for each of the generated clusters. An online system computes an improvement score for each cluster based on the performance scores of the clusters. To determine whether to perform another iteration, an online system computes an aggregated improvement score based on the improvement scores of the clusters. If an online system determines that the aggregated improvement score does not meet the threshold, an online system performs another iteration of the process above. When an online system finishes the iterative process, an online system outputs the improvement scores of the most-recent iteration.

18 Claims, 5 Drawing Sheets

(56) References Cited

U.S. PATENT DOCUMENTS

| | | | |
|---|---|---|---|
| 2018/0181572 A1 | 6/2018 | Guo et al. | |
| 2018/0225588 A1 | 8/2018 | Khidekel et al. | |
| 2018/0253661 A1* | 9/2018 | Strauss | G06N 20/00 |
| 2018/0349398 A1* | 12/2018 | Ardite | G06F 16/432 |
| 2019/0205402 A1* | 7/2019 | Sernau | G06Q 50/01 |
| 2022/0092645 A1 | 3/2022 | Pan et al. | |
| 2022/0229676 A1* | 7/2022 | Ramachandran | H04L 51/02 |

OTHER PUBLICATIONS

PCT International Search Report and Written Opinion, PCT Application No. PCT/US2023/58500, Apr. 23, 2024, 15 pages.

* cited by examiner

COUNTERFACTUAL POLICY EVALUATION OF MODEL PERFORMANCE

CROSS REFERENCE TO RELATED APPLICATIONS

This application claims the benefit of U.S. Provisional Application No. 63/478,138, filed Dec. 31, 2022, which is incorporated by reference in its entirety.

This application also incorporates by reference the following applications:

Commonly owned U.S. application Ser. No. 18/393,338, entitled "Generating Training Data for Bundle Scoring Machine-Learning Model Based on Content Selection Models," and filed on Dec. 21, 2023.

Commonly owned U.S. application Ser. No. 18/393,380, entitled "Training Data Generation by Bucketing Users based on Output of a Contextual Bandit Model" and filed on Dec. 21, 2023.

BACKGROUND

Online systems use content selection frameworks to select content to present to their users. A content selection framework is a set of rules, policies, and models that are used to select which content to present to which users. For example, a content selection framework generally includes a machine-learning model that has been trained to score content items, eligibility criteria that dictate which users are eligible to receive certain content items, or hyperparameters that specify when and how content items are presented to users. Online systems may test a set of candidate content selection frameworks to determine which candidate selection framework performs best for users. However, testing a candidate selection framework can require significant time or resource investments by the online system, which means that testing new candidate selection frameworks tends to be relatively rare.

SUMMARY

In accordance with one or more aspects of the disclosure, an online system uses an offline iterative clustering process to evaluate the performance of a set of content selection frameworks. The iterative evaluation process uses testing example data to evaluate the performance of content selection frameworks. Testing example data is data that describes the performance of the content selection frameworks when used to select content items to present to users. The testing example data includes a set of testing examples that correspond to instances where content items are presented to users. Each testing example may include user data for a user to whom a content item was presented, content item data describing the content item, an identifier for the content selection framework that was used to select the content item, and a label indicating whether the user interacted with the content item.

To perform an iteration of the iterative clustering process, the online system clusters the testing example data into a set of clusters. Each cluster defines a subset of the users to which content items were presented in the testing example data, and the cluster comprises the testing examples using cluster parameters for the cluster. The cluster parameters for a cluster define user attributes for users to be included in the cluster. For example, the cluster parameters may specify certain values for user attributes that constrain which users may be included in the cluster.

The online system computes a set of framework scores for each of the generated clusters. A framework score for a cluster represents the performance of a content selection framework in selecting content for users in the cluster. For example, the framework score may be the rate at which users in the cluster interact with content items selected by the content selection framework. The online system computes a framework score based on the training examples in the cluster that were generated based on content items selected by that content selection framework, and computes, for each cluster, a set of framework scores corresponding to the set of content selection frameworks.

The online system computes an improvement score for each cluster based on the performance scores of the clusters. The improvement score for a cluster represents a theoretical performance of an optimal content selection framework for the cluster. The optimal content selection framework is the content selection framework with the best performance as indicated by the computed performance scores for the cluster (e.g., the content selection framework with the highest interaction rate of users with content items). The improvement score may simply be the highest performance score computed for the cluster or may be a function of the set of performance scores.

To determine whether to perform another iteration, the online system computes an aggregated improvement score based on the improvement scores of the clusters. The aggregated improvement score represents an overall improvement of selecting content using optimal content selection frameworks. For example, the aggregated improvement score may be an average or weighted average of the improvement scores of the clusters. The online system compares the aggregated improvement score to a threshold to determine whether to perform another iteration. For example, the online system may determine whether a statistically significant improvement occurred based on the aggregated improvement score. In some embodiments, the threshold is based on an aggregated improvement score computed in a previous iteration.

If the online system determines that the aggregated improvement score does not meet the threshold, the online system performs another iteration of the process above. In the new iteration, the online system generates new, smaller clusters and performs the same process. The online system continues these iterations until the aggregated improvement score meets the threshold.

When the online system finishes the iterative process, the online system outputs the improvement scores of the most-recent iteration. In some cases, the online system transmits the improvement scores to a client device for display to a user. The online system also may use the improvement scores to select a content selection framework to use for selecting future content items to display to users. For example, the online system may select the content selection framework based on the aggregated improvement score. The online system also may dynamically choose which content selection framework to apply when an opportunity to present content arises by determining which cluster a user would belong to and determining which content selection framework had the best improvement score computed for that cluster.

DETAILED DESCRIPTION

Figure 1:
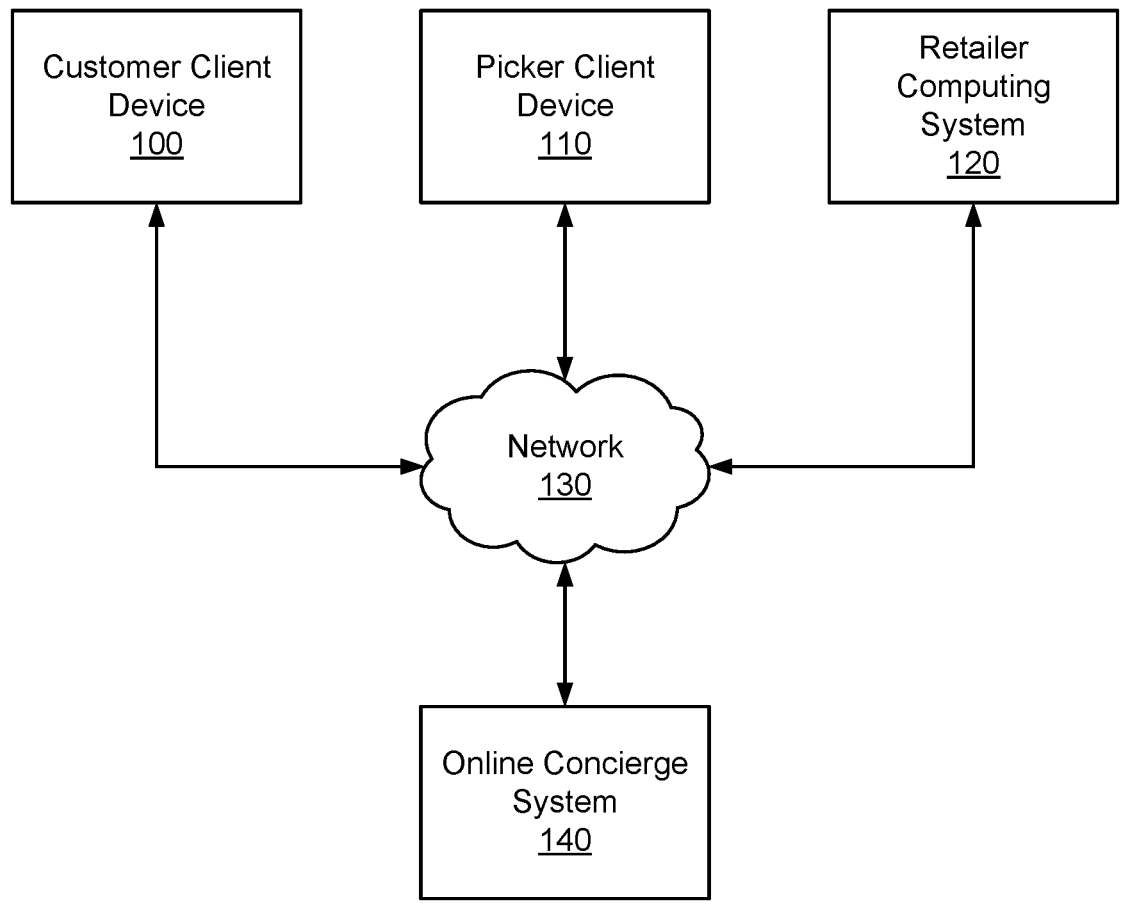
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a user client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and retailer computing system 120 are illustrated in FIG. 1, any number of users, pickers, and retailers may interact with the online concierge system 140. As such, there may be more than one user client device 100, picker client device 110, or retailer computing system 120.

The user client device 100 is a client device through which a user may interact with the picker client device 110, the retailer computing system 120, or the online concierge system 140. The user client device 100 can be a personal or mobile computing device, such as a smartphone, a tablet, a laptop computer, or desktop computer. In some embodiments, the user client device 100 executes a client application that uses an application programming interface (API) to communicate with the online concierge system 140.

A user uses the user client device 100 to place an order with the online concierge system 140. An order specifies a set of items to be delivered to the user. An "item," as used herein, means a good or product that can be provided to the user through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The user client device 100 presents an ordering interface to the user. The ordering interface is a user interface that the user can use to place an order with the online concierge system 140. The ordering interface may be part of a client application operating on the user client device 100. The ordering interface allows the user to search for items that are available through the online concierge system 140 and the user can select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the item should be collected.

The user client device 100 may receive additional content from the online concierge system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online concierge system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same retailer location. The collection interface further presents instructions that the user may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the user client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a user's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the user client device 100 for display to the user, so that the user can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The user client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which users can order items to be provided to them by a picker from a retailer. The online concierge system 140 receives orders from a user client device 100 through the network 130. The online concierge system 140 selects a picker to service the user's order and transmits the order to a picker client device 110 associated with the picker. The picker collects the ordered items from a retailer location and delivers the ordered items to the user. The online concierge system 140 may charge a user for the order and provide portions of the payment from the user to the picker and the retailer.

As an example, the online concierge system 140 may allow a user to order groceries from a grocery store retailer. The user's order may specify which groceries they want delivered from the grocery store and the quantities of each of the groceries. The user's client device 100 transmits the user's order to the online concierge system 140 and the online concierge system 140 selects a picker to travel to the grocery store retailer location to collect the groceries ordered by the user. Once the picker has collected the groceries ordered by the user, the picker delivers the groceries to a location transmitted to the picker client device 110 by the online concierge system 140. The online concierge system 140 is described in further detail below with regards to FIG. 2.

Figure 2:
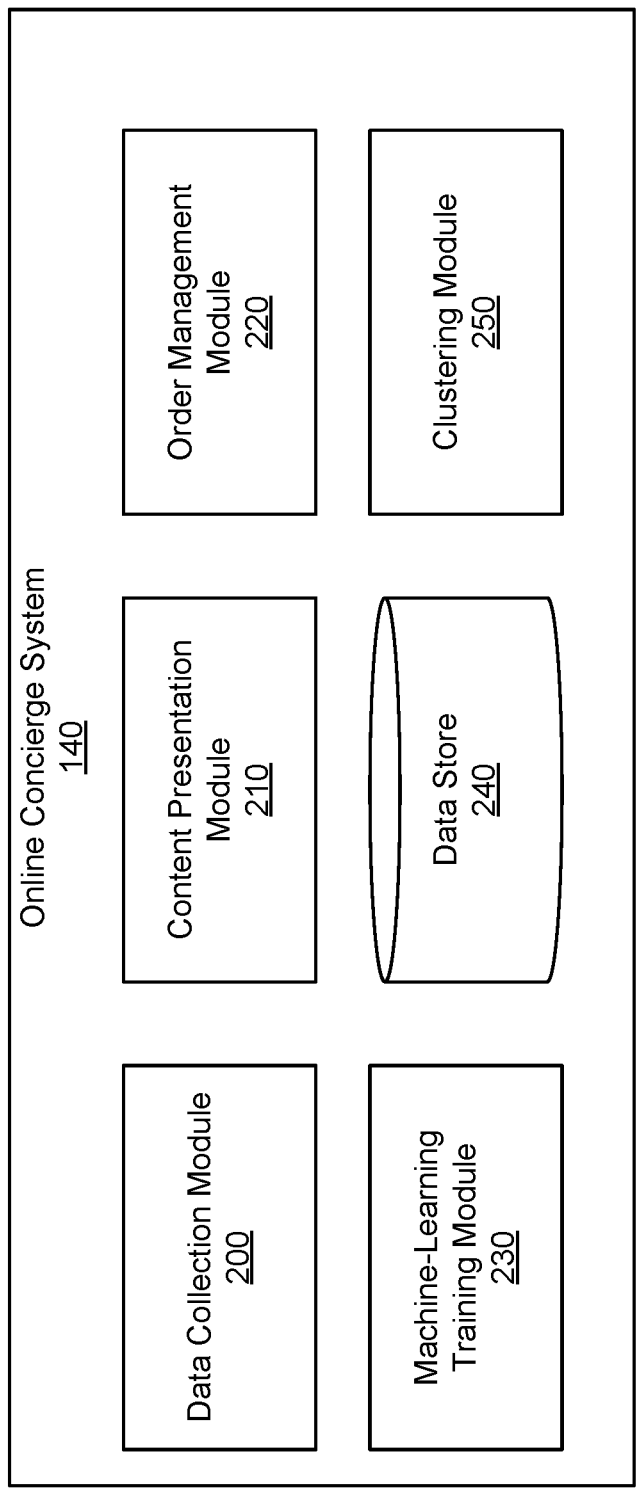
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default retailer/retailer location, payment instrument, delivery location, or delivery timeframe. The data collection module 200 may collect the user data from sensors on the user client device 100 or based on the user's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the user client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a user rating for the picker, which retailers the picker has collected items at, or the picker's previous shopping history. Additionally, the picker data may include preferences expressed by the picker, such as their preferred retailers to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a user associated with the order, a retailer location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may weigh the score for an item based on the predicted availability of the item. Alternatively, the content presentation module 210 may filter out items from presentation to a user based on whether the predicted availability of the item exceeds a threshold.

The order management module 220 that manages orders for items from users. The order management module 220 receives orders from a user client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to assign an order to a picker based on a delivery timeframe requested by the user with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross-entropy loss function. The machine-learning training module 230 updates the set of parameters for the machine-learning model based on the score generated by the loss function. For example, the machine-learning training module 230 may apply gradient descent to update the set of parameters.

The data store 240 stores data used by the online concierge system 140. For example, the data store 240 stores user data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

Figure 3:
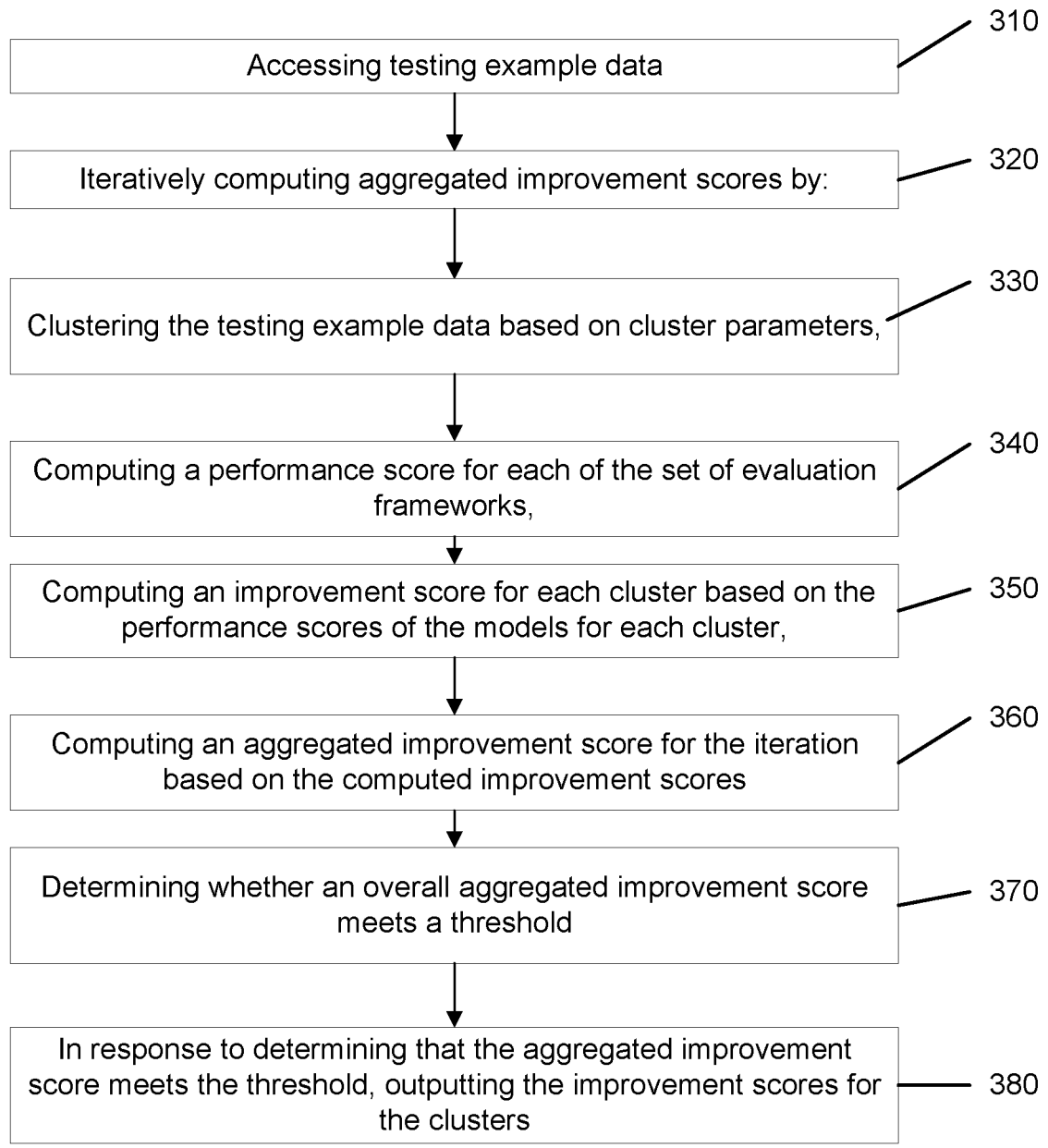
FIG. 3 is a flowchart for a method of determining optimized performance of models on set of users, in accordance with some embodiments.

The clustering module 250 clusters the testing example data and generates the improvement scores as discussed further in FIG. 3.

FIG. 3 is a flowchart for a method of determining optimized performance of models on a set of users, in accordance with some embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140). Additionally, each of these steps may be performed automatically by the online concierge system without human intervention.

The online concierge system 140 accesses 310 testing example data. The clustering module 150 uses an offline iterative clustering process to evaluate the performance of a set of content selection frameworks. The clustering module 250 accesses testing example data to evaluate the performance of content selection frameworks. Each content selection framework is a different set of evaluations over how a content item is assigned to a user. For example, a content selection framework generally includes a machine-learning model that has been trained to score content items, eligibility criteria that dictate which users are eligible to receive certain content items, or hyperparameters that specify when and how content items are presented to users. In some embodiments, the machine-learning model is a contextual bandit model that is trained to score content items. As referred to herein, a "content item" is a piece of content provided to the user with an associated action. In some embodiments, content items are associated with a specification interaction that requires a specific associated action. For example, content items include notifications, messages, queries, videos, invitations, and coupon offers. For example, in assigning content items, the content selection framework may assign notifications, messages, queries, videos, invitations or coupon offers to the user and require actions such as applying the coupon, watching the video, or accepting the invitation. In some embodiments, the content selection frameworks assign content items to the user based on random selection.

Testing example data is data that describes the performance of the content selection frameworks when used to select content items to present to users. Testing example data may be collected over a testing period, or at some regular interval. For example, testing example data may be collected once every 28 days. The testing example data includes a set of testing examples that correspond to instances where content items are presented to users. Each testing example may include user data for a user to whom a content item was presented, content item data describing the content item, an identifier for the content selection framework that was used to select the content item, and any labels such as a label indicating whether the user interacted with the content item. Content item data may include a description of the content being displayed, and a description of how the content needs to be displayed on the client device. Labels may also include information such as type of interaction or other metrics. For example, some content items may be associated with an interaction that is a click of a button or an opening of a new window, while other content items may be associated with adding a product to a cart, or making a purchase.

To perform an iteration of the iterative clustering process, the online system clusters 330 the testing example data into a set of clusters. Each cluster defines a subset of the users to which content items were presented in the testing example data, and the cluster comprises the testing examples using cluster parameters for the cluster. Cluster parameters are a set of definitions over how to parse the set of content selection frameworks and the set of users, in order to cluster the example data and measure certain subsets of users as assigned to certain subsets of content selection frameworks. The cluster parameters for a cluster define user attributes for users to be included in the cluster. For example, the cluster parameters may specify certain values for user attributes that constrain which users may be included in the cluster, such as values tracking length of time since most recent order, number of orders over a period of time, money spent over a period of time, number of brands purchased, and number of retailers purchased from. For example, the system may set one cluster based on the results of users who have had an account for less than 2 years, and another cluster of users who had an account for more than 2 years. Certain user features and attributes are identified as particularly helpful. Clusters may be based on multiple parameters. Each user may only be in one cluster. Cluster parameters may be in the form of ranges or in discrete values.

The online system computes 340 a set of framework scores for each of the generated clusters. A framework score for a cluster represents the performance of a content selection framework in selecting content for users in the cluster. For example, the framework score may be the rate at which users in the cluster interact with content items selected by the content selection framework. The online system may compute the rate at which users interact with content items for each of the generated clusters. The online system computes a framework score based on the training examples in the cluster that were generated based on content items selected by that content selection framework, and computes, for each cluster, a set of framework scores corresponding to the set of content selection frameworks.

The online system computes 350 an improvement score for each cluster based on the performance scores of the clusters. The improvement score for a cluster represents a theoretical performance of a suitable content selection framework for the cluster. The suitable content selection framework is the content selection framework with the best performance as indicated by the computed performance scores for the cluster (e.g., the content selection framework with the highest interaction rate of users with content items). The improvement score may be the highest performance score computed for the cluster or may be a function of the set of performance scores. For example, the online system may compute a weighted average of the set of performance scores, or may be a median or mode performance score of the set of performance scores.

Figure 4:
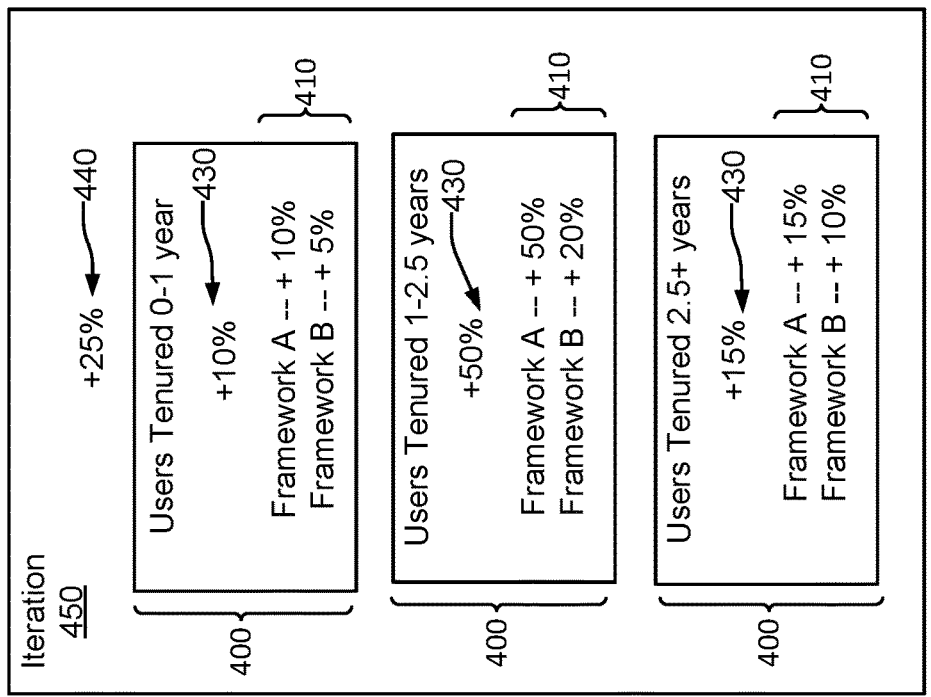
FIG. 4 illustrates clusters, performance scores and improvement scores, in accordance with some embodiments.
Figure 4:
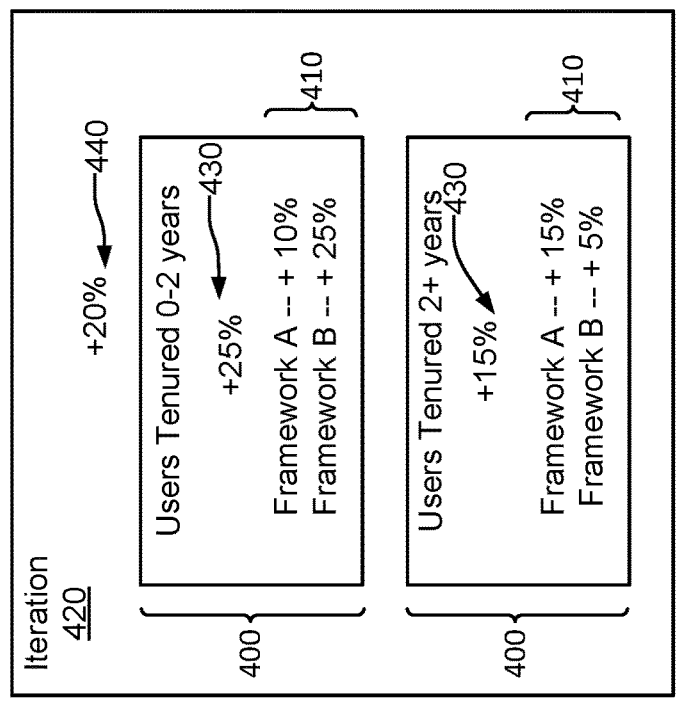

FIG. 4 illustrates clusters, performance scores and improvement scores, in accordance with some embodiments. FIG. 4 generates clusters based on testing example data and generates the first split of clusters in iteration 420. Iteration 420 shows that Framework A and Framework B vary in performance for each cluster. The framework performance scores are scores 410, the improvement scores are scores 430 and the aggregated improvement score 440 is shown for the iteration 420. The second iteration 450 shows a new clustering of the data, using the same frameworks A and B, with new improvement scores 430 and an aggregated improvement score 440.

To determine whether to perform another iteration, the online system computes 360 an aggregated improvement score based on the improvement scores of the clusters. The aggregated improvement score represents an overall improvement of selecting content using suitable content selection frameworks. For example, the aggregated improvement score may be an average or weighted average of the improvement scores of the clusters. The online system compares the aggregated improvement score to a threshold to determine whether to perform another iteration. For example, the online system may determine whether a statistically significant improvement occurred based on the aggregated improvement score.

The online concierge system 140 determines 370 whether the aggregated improvement score meets a threshold of improvement. A threshold is set as a minimum improvement for which there is a significant improvement in performance of the offers as assigned to the user under the new content selection framework. In some embodiments, the threshold is based on an aggregated improvement score computed in a previous iteration. For example, if the previous iteration reached a certain aggregated improvement score, the threshold may be set such that the next iteration must at least meet, if not surpass that previous improvement score in order to proceed. For another example, the threshold may be set at a certain distance from the maximum or minimum performance so far in past iterations. If the online system determines that the aggregated improvement score does not meet the threshold, the online system performs another iteration of the process above. In the new iteration, the online system generates new, smaller clusters and performs the same process. The online system continues these iterations until the aggregated improvement score meets the threshold.

The online system may generate these new smaller clusters in a similar process to the original process of cluster. The online system determines the ranges of relevant users attributes, and splits the ranges of user attributes into sections.

The ranges may be split based on a median value. The online system may analyze multiple user attributes in this way. The online system may do a k-means clustering, grouping similar data points into K number of clusters, and just increase the value of K and therefore the number of clusters to be formed with the same amount of data, leading to smaller clusters.

Figure 5:
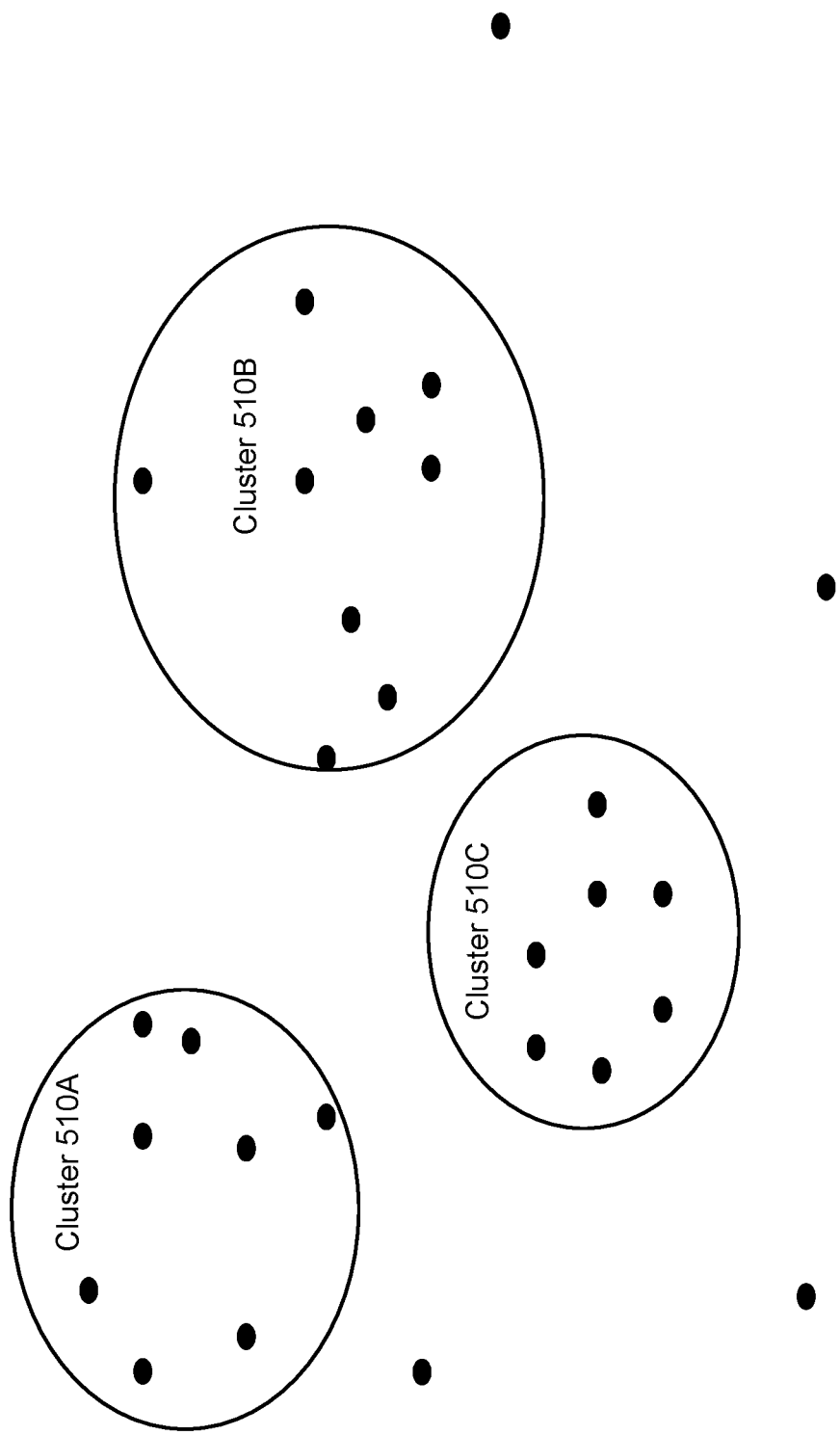
FIG. 5 illustrates clustering data points on a two-dimensional space with data points grouped into clusters, in accordance with some embodiments.

FIG. 5 illustrates clustering data points on a 2-dimensional space with data points grouped into clusters 510, in accordance with some embodiments. Each of the clusters 510 (include cluster 510a, cluster 510b, and cluster 510c) captures a grouping of datapoints. Clusters 510 are not all the same size and do not all capture the same number of data points. In this illustration, each data point is a user and piece of testing data, and each axis of the 2-dimensional space is a user attribute. In this illustration, only 2 dimensions are depicted for easy illustration. Clusters may be based on one or more user attributes and may be set to cover the full range of the spectrum of ranges. In FIG. 5 as illustrated, some testing data falls outside the clusters. In some embodiments, the clustering module 250 may cluster the data points such that all data points are assigned to a cluster.

When the online system finishes the iterative process, the online system outputs 380 the improvement scores of the most-recent iteration. In some cases, the online system transmits the improvement scores to a client device for display to a user. The online system also may use the improvement scores to select a content selection framework to use for selecting future content items to display to users. For example, the online system may select the content selection framework based on the aggregated improvement score. The online system also may dynamically choose which content selection framework to apply when an opportunity to present content arises by determining which cluster a user would belong to and determining which content selection framework had the best improvement score computed for that cluster. The online system may also output the performance of users based on user attributes and which subset of users performs best under which of the content selection frameworks. The output data may be used to select one suitable framework to be implemented for all users, an suitable policy for a combination of frameworks based on the clustering data, or other policy determinations to be based about suitable performance related to the assignment of the content selection frameworks to determine which content item goes to which user.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:
1. A method comprising:
    accessing testing example data describing testing of a set of content selection frameworks of an online system, wherein the testing example data comprises a set of testing examples, wherein each content selection framework comprises a machine-learning model that is trained to score content items for presentation to users, and wherein each testing example of the set of testing examples comprises:
  user data describing a user of a plurality of users to which a content item was presented;
  content item data describing the content item presented to the user;
  a framework identifier that indicates which content selection framework was used to select the content item; and
  a label indicating whether the user interacted with the content item;
iteratively computing aggregated improvement scores by:
  clustering the testing example data into a set of clusters based on cluster parameters for each of the clusters in the set of clusters, wherein each cluster comprises a subset of the plurality of users and wherein the cluster parameters for a cluster define attributes of the subset of users associated with the cluster;
  generating a set of framework performance scores for each cluster of the set of clusters based on the accessed testing example data, wherein each framework performance score of the set of framework performance scores for a cluster represents a performance of a content selection framework of the set of content selection frameworks;
  generating an improvement score for each cluster of the set of clusters based on the set of framework performance scores associated with each cluster;
  generating an aggregated improvement score based on the computed improvement scores for the set of clusters; and
  identifying whether the aggregated improvement score meets an improvement threshold;
in response to determining that the aggregated improvement score meets the threshold, transmitting a final set of improvement scores to a user device, wherein the transmitting causes the user device to display the final set of improvement scores;
identifying an opportunity to present a content item to a user of the online system;
selecting a content selection framework of the set of content selection frameworks to select a content item to present to the user based on the final set of improvement scores; and
applying the content selection framework to select a content item to present to the user.

2. The method of claim 1, wherein selecting the content selection framework based on the final set of improvement scores comprises:
  identifying a cluster corresponding to the user based on user data describing the user; and
  selecting the content selection framework based on the set of framework performance scores for the identified cluster.

3. The method of claim 1, wherein computing an improvement score for each cluster of the set of clusters comprises:
  identifying an optimal content selection framework for the cluster based on the framework performance scores computed for the cluster.

4. The method of claim 1, wherein the cluster parameters define user attributes comprising geographical location, age, gender, consumer behavior data, or membership duration.

5. The method of claim 1, wherein determining whether the aggregated improvement scores meets an improvement threshold comprises:
  comparing the aggregated improvement score to an aggregated improvement score of a previous iteration.

6. The method of claim 1, further comprising:
in response to identifying that the aggregated improvement score does not meet the threshold:
  generating a new set of clusters for the testing example data, wherein the new set of clusters comprises more clusters than the set of clusters; and
  generating an aggregated improvement score based on the new set of clusters.

7. The method of claim 1, wherein generating the improvement score for each cluster comprises:
  identifying a maximum framework performance score of the set of framework performance scores for the cluster.

8. The method of claim 1, wherein generating the aggregated improvement score based on the computed improvements scores comprises:
  generating an average of the computed improvements scores for the set of clusters.

9. The method of claim 1, further comprising:
  retraining a machine-learning model of a content selection framework of the set of content selection frameworks based on the final set of improvement scores.

10. A non-transitory computer-readable medium, the medium having encoded thereon a set of instructions that, when executed by a computing device, cause the computing device to perform a process comprising:
  accessing testing example data describing testing of a set of content selection frameworks of an online system, wherein the testing example data comprises a set of testing examples, wherein each content selection framework comprises a machine learning model that is trained to score content items for presentation to users, and wherein each testing example of the set of testing examples comprises:
    user data describing a user of a plurality of users to which a content item was presented;
    content item data describing the content item presented to the user;
    a framework identifier that indicates which content selection framework was used to select the content item; and
    a label indicating whether the user interacted with the content item;
  iteratively computing aggregated improvement scores by:
    clustering the testing example data into a set of clusters based on cluster parameters for each of the clusters in the set of clusters, wherein each cluster comprises a subset of the plurality of users and wherein the cluster parameters for a cluster define attributes of the subset of users associated with the cluster;
    computing a set of framework performance scores for each cluster of the set of clusters based on the accessed testing example data, wherein each framework performance score of the set of framework performance scores for a cluster represents a performance of a content selection framework of the set of content selection frameworks;
    computing an improvement score for each cluster of the set of clusters based on the set of framework performance scores associated with each cluster;
    computing an aggregated improvement score based on the computed improvement scores for the set of clusters; and
    determining whether the aggregated improvement score meets an improvement threshold;

in response to determining that the aggregated improvement score meets the threshold, transmitting a final set of improvement scores to a user device, wherein the transmitting causes the user device to display the final set of improvement scores;

identifying an opportunity to present a content item to a user of the online system;

selecting a content selection framework of the set of content selection frameworks to select a content item to present to the user based on the final set of improvement scores; and applying the content selection framework to select a content item to present to the user.

11. The non-transitory computer-readable medium of claim 10, wherein selecting the content selection framework based on the final set of improvement scores comprises:

identifying a cluster corresponding to the user based on user data describing the user; and selecting the content selection framework based on the set of framework performance scores for the identified cluster.

12. The non-transitory computer-readable medium of claim 10, wherein computing an improvement score for each cluster of the set of clusters comprises:

identifying an optimal content selection framework for the cluster based on the framework performance scores computed for the cluster.

13. The non-transitory computer-readable medium of claim 10, wherein the cluster parameters define user attributes comprising geographical location, age, gender, consumer behavior data, or membership duration.

14. The non-transitory computer-readable medium of claim 10, wherein determining whether the aggregated improvement scores meets an improvement threshold comprises:

comparing the aggregated improvement score to an aggregated improvement score of a previous iteration.

15. The non-transitory computer-readable medium of claim 10, the process further comprising:

in response to determining that the aggregated improvement score does not meet the threshold:

generating a new set of clusters for the testing example data, wherein the new set of clusters comprises more clusters than the set of clusters; and computing an aggregated improvement scores based on the new set of clusters.

16. The non-transitory computer-readable medium of claim 10, wherein computing the improvement score for each cluster comprises:

identifying a maximum framework performance score of the set of framework performance scores for the cluster.

17. The non-transitory computer-readable medium of claim 10, wherein computing the aggregated improvement score based on the computed improvements scores comprises:

computing an average of the computed improvements scores for the set of clusters.

18. A system comprising a processor and a non-transitory computer-readable medium, the medium having encoded thereon a set of instructions that, when executed by the processor, cause the processor to perform a process comprising:

accessing testing example data describing testing of a set of content selection frameworks of an online system, wherein the testing example data comprises a set of testing examples, wherein each content selection framework comprises a machine learning model that is trained to score content items for presentation to users, and wherein each testing example of the set of testing examples comprises:

user data describing a user of a plurality of users to which a content item was presented;

content item data describing the content item presented to the user;

a framework identifier that indicates which content selection framework was used to select the content item; and a label indicating whether the user interacted with the content item;

iteratively computing aggregated improvement scores by:

clustering the testing example data into a set of clusters based on cluster parameters for each of the clusters in the set of clusters, wherein each cluster comprises a subset of the plurality of users and wherein the cluster parameters for a cluster define attributes of the subset of users associated with the cluster;

computing a set of framework performance scores for each cluster of the set of clusters based on the accessed testing example data, wherein each framework performance score of the set of framework performance scores for a cluster represents a performance of a content selection framework of the set of content selection frameworks;

computing an improvement score for each cluster of the set of clusters based on the set of framework performance scores associated with each cluster;

computing an aggregated improvement score based on the computed improvement scores for the set of clusters; and determining whether the aggregated improvement score meets an improvement threshold;

in response to determining that the aggregated improvement score meets the threshold, transmitting a final set of improvement scores to a user device, wherein the transmitting causes the user device to display the final set of improvement scores;

identifying an opportunity to present a content item to a user of the online system;

selecting a content selection framework of the set of content selection frameworks to select a content item to present to the user based on the final set of improvement scores; and applying the content selection framework to select a content item to present to the user.

* * * * *